(No Model.)
B. GALLAGHER & R. A. JOHNSON.
SAW ATTACHMENT.
No. 495,731. Patented Apr. 18, 1893.
Fig. I.
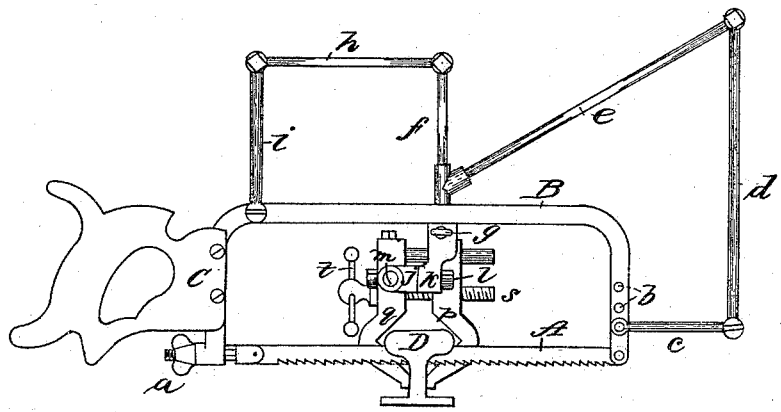
Fig. II.
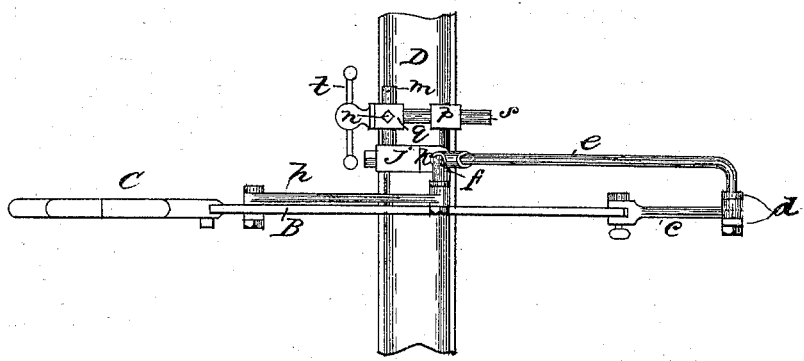
WITNESSES.
Ralph W. E. Hopper.
Eugene Humphrey
INVENTORS.
Bernard Gallagher
Rufus A. Johnson
per T. W. Porter Atty

United States Patent Office.

BERNARD GALLAGHER, OF LYNN, AND RUFUS A. JOHNSON, OF SAUGUS, MASSACHUSETTS.

SAW ATTACHMENT.

SPECIFICATION forming part of Letters Patent No. 495,731, dated April 18, 1893.

Application filed December 12, 1892. Serial No. 455,094. (No model.)

*To all whom it may concern:*

Be it known that we, BERNARD GALLAGHER, of Lynn, and RUFUS A. JOHNSON, of Saugus, in the county of Essex and State of Massachusetts, have invented a new and useful Improvement in Saw Attachments, which will, in connection with the accompanying drawings, be hereinafter fully described, and specifically defined in the appended claims.

In said drawings, Figure 1 is a side elevation of our invention as in the act of being used; and Fig. 2 a top plan view thereof.

This invention relates to that class of saws termed "hack saws," which are principally used for sawing metal when it is inconvenient or impossible to sever it by the use of machinery; and the invention consists in such a saw duly mounted in its supporting frame, and connected at or near its ends with pivotal levers, that by suitable connections lead to and are pivotally united with a standard that is also pivotally secured in a vise, by which the saw and its attachments are fastened to the rail or other article of metal that is to be sawed.

Referring again to said drawings, A represents the saw, B is the saw frame, C is the saw handle and D represents a railroad rail as being cut by the saw. The tension of the saw in its frame B is regulated by a thumb nut $a$ arranged to bear against handle C in a well known manner. In the front part of B are holes $b$, in one of which link $c$ is pivoted; to this horizontal link is pivoted the vertical link $d$ which at its top is pivoted to oblique link $e$ which at its lower end is rigidly secured to vertical standard $f$, which is inserted in block $k$ so as to rotate therein; it being secured in place by a set screw $g$ inserted in the block and fitting in a circumferential groove in said standard $f$, so as to allow it to therein rotate without liability of being displaced therefrom. To the top of standard $f$ is pivoted a link $h$ which at its opposite end is pivoted to vertical link $i$ which at its opposite end is pivoted to the rear part of frame B. Opposite to block $k$ is a block $j$, in which is secured the rod $m$ which passes from thence through the vise jaw $q$ in which it is secured by a set screw $n$. Said blocks $j$, $k$, are secured together by a bolt $l$ which also passes through rod $m$ and secures the same in block $j$. Opposite to vise jaw $q$ is another jaw $p$ in which is threaded the screw $s$ that passes through jaw $q$ as shown; a lever $t$ serves as the means of actuating screw $s$. The jaws $p$, $q$, are formed to be secured to various kinds of bars, rods, or other articles, to be cut by saw A, and may be formed with an outward flare, as shown, to receive the head of rail D, or in any desired manner. It will be seen that block $k$ can be rotated on bolt $l$ so that standard $f$ will be at any desired angle to rod $m$, while as standard $f$, by its rotary action in block $k$, allows the saw to be at any desired angle to rod $m$ therefore the saw can make its cut at any desired vertical or horizontal angle as the nature of its duty may render requisite.

We claim as our invention—

1. The saw supporting mechanism consisting of a standard, $f$, duly supported and a link, $h$, pivoted to the said standard and a link, $i$, pivoted to the link $h$ and to the rear part of the saw frame; and a link, $e$, rigidly secured at one end in the standard and the links, $c$ $d$, pivoted to the said link $e$ and to the front part of the saw frame, substantially as specified.

2. A saw connected with a standard $f$ by links, substantially as described, and said standard pivoted in a block $k$ so as to admit its rotation upon its own axis in manner as specified.

3. The combination of the blocks $j$ $k$ secured together by a rod $l$, on which rod said blocks can rotate as described, the vise connected with the block $j$ by a rod $m$, and the rod $f$ pivoted in said block $k$, and the saw supports attached to the rod $f$ all substantially as specified.

4. The combination of the vise, connected with blocks $j$ $k$ by a rod $m$ passing through a jaw $q$ of the vise, and adjustable both lineally and by rotation in such connection, and the standard $f$, of the saw supports arranged to be adjusted by rotation in block $k$, and the saw supports all substantially as specified.

BERNARD GALLAGHER.
RUFUS A. JOHNSON.

Witnesses:
ROBERT ASHE,
THOMAS W. PORTER.